(12) United States Patent
Iijima et al.

(10) Patent No.: US 6,344,235 B1
(45) Date of Patent: Feb. 5, 2002

(54) METHOD OF PRODUCING AN ELECTRODE FOR NON-AQUEOUS ELECTROLYTIC CELLS

(75) Inventors: Tadayoshi Iijima; Shigeo Kurose, both of Saku; Tetsuya Takahashi, Nagano, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/424,590

(22) PCT Filed: May 27, 1998

(86) PCT No.: PCT/JP98/02313

§ 371 Date: Nov. 24, 1999

§ 102(e) Date: Nov. 24, 1999

(87) PCT Pub. No.: WO98/54770

PCT Pub. Date: Dec. 3, 1998

(30) Foreign Application Priority Data

May 27, 1997 (JP) .............................................. 9-136661

(51) Int. Cl.⁷ ................................................ B05D 5/12
(52) U.S. Cl. ........................ 427/122; 427/77; 427/189; 427/201

(58) Field of Search .......................... 427/77, 122, 189, 427/201; 429/217; 29/623.1

(56) References Cited

U.S. PATENT DOCUMENTS 4,064,327 A * 12/1977 King et al.
5,576,121 A * 11/1996 Yamada et al.
5,720,780 A *  2/1998 Liu et al.

* cited by examiner

*Primary Examiner*—John S. Maples
(74) *Attorney, Agent, or Firm*—Oblon, Spivak, McClelland, Maier & Neustadt, P.C.

(57) ABSTRACT

This invention is a method for producing an electrode for a non-aqueous electrolytic cell, in which a collector is coated with an electrode active material layer comprising an active material, flake graphite and a binder, which is characterized by that the graphite is subjected to a pulverization process twice or more, followed by mixing and pulverization using the active material, and provides an electrode for a secondary cell which is good in charge and discharge characteristics such as discharge capacity and charge and discharge cycle life, and improved in physical characteristics.

2 Claims, 1 Drawing Sheet

METHOD OF PRODUCING AN ELECTRODE FOR NON-AQUEOUS ELECTROLYTIC CELLS

TECHNICAL FIELD

The present invention relates to a method for producing an electrode for a non-aqueous electrolytic cell, and a method for producing an electrode for a non-aqueous electrolytic cell, in which a collector is coated with an electrode active material layer comprising an active material, flake graphite and a binder.

BACKGROUND ART

Of non-aqueous electrolytic cells high in discharge potential and discharge capacity, lithium ion secondary cells occluding and releasing lithium have recently come in practice. Electrodes of these cells are produced by preparing paints for active material layers using active materials and binders, applying the paints onto collectors, and drying them.

The active materials used in the electrodes are poor in electric conductivity, except for some materials, so that conductive materials are used.

In the electrodes, the role of the conductive materials is important. If the conductive materials do not act effectively, the problem arises that the capacity of the cells is decreased, or that the cycle life is reduced.

In the lithium ion secondary cells, for example, when carbon is used as the active materials in negative electrodes, the introduction of lithium into the active materials expands them, and the release of lithium therefrom contracts them. In the lithium ion secondary cells, charge and discharge are repeated, which causes the active materials to repeat expansion and contraction. When the active materials are contracted, the contact of the active materials with the conductive materials becomes poor. The cells are therefore gradually deteriorated.

The non-aqueous electrolytic secondary cells include cells using carbon black such as acetylene black as the conductive materials, for example, "a non-aqueous electrolytic secondary cell having a negative electrode in which an alkali metal is used as an active material, non-aqueous electrolyte and a positive electrode, wherein a conductive material of said positive electrode comprises a large amount of metallic Ti powder and a small amount of carbon black" (Japanese Patent Unexamined Publication No. 62-15761), and cells using $LiMn_2O_4$ as the active materials and graphite as the conductive materials, for example, "a non-aqueous electrolytic secondary cell having a positive electrode mainly comprising $LiMn_2O_4$ and graphite, a negative electrode and non-aqueous electrolyte, wherein the ratio of graphite to the total amount of said $LiMn_2O_4$ and graphite is 8% to 22% by weight" (Japanese Patent Unexamined Publication No. 1-105459).

Further, methods for producing related electrodes for cells include, for example, "a method for producing a cell electrode comprising an insoluble, infusible substrate, a heat-treated product of a phenol resin, having a polyacene skeleton structure with a hydrogen/carbon atom number ratio of 0.5 to 0.05, and having a specific surface area value according to a BET method of at least 600 $m^2/g$, wherein a powder of said insoluble, infusible substrate are mixed with a conductive material and a binder, and the resulting mixture is applied to press molding or coating or adhered under pressure onto a support" (Japanese Patent Unexamined Publication No. 63-301460).

When carbon black such as acetylene black is used as the conductive materials, as described in Japanese Patent Unexamined Publication No. 62-15761 mentioned above, the problems are encountered that the adhesion of a coating film to a collector is poor, resulting in easy separation, and that a coating film becomes too hard to obtain good flexibility, resulting in easy cracking of the electrode, because of large surface area of acetylene black.

When the graphite is used as the conductive material, for example, as described in Japanese Patent Unexamined Publication No. 1-105459 mentioned above, the flexibility of a coating film is good, but the graphite having a small central particle size reduces the cycle life. On the other hand, the graphite having a large size is difficult to exhibit an effect as the conductive material, if it is not added in large amounts.

In the invention of Japanese Patent Unexamined Publication No. 63-301460, the particle size of the conductive material is decreased. However, the use of the graphite having a small particle size results in reduced cycle life.

In view of the problems as described above, the present invention provides an electrode for a non-aqueous electrolytic cell having good charge and discharge characteristics such as discharge capacity and charge and discharge cycle life, and improved in physical characteristics.

DISCLOSURE OF INVENTION

In order to solve the above-mentioned problems, the present inventors have conducted intensive investigation. As a result, the present inventors have discovered that the above-mentioned problems can be solved to achieve an object of the present invention by producing an electrode for a non-aqueous electrolytic cell using an active material and flake graphite wherein a pulverization process of said graphite is carried out twice or more, followed by mixing and pulverization of said graphite using said active material, thus completing the present invention.

That is to say, the present invention provides (1) a method for producing an electrode for a non-aqueous electrolytic cell, in which a collector is coated with an electrode active material layer comprising an active material, flake graphite and a binder, which is characterized by that said graphite is subjected to a pulverization process twice or more, and thereafter, mixed and pulverized using said active material; (2) the method described in the above (1), wherein the central particle size of said graphite is larger than that of said active material; (3) the method described in the above (1) or (2), wherein the amount of the conductive material contained in a coating film is from 0.1% to 15% by weight; (4) the method described in the above (1) or (2), wherein the active material is a negative electrode active material; and (5) the method described in the above (1) or (2), wherein the active material is a positive electrode active material.

The present invention will be described below in detail.

An object of the present invention is to provide a method for producing an electrode for a non-aqueous electrolytic cell, the electrode being improved in charge and discharge characteristics such as discharge capacity and charge and discharge cycle life, and in physical characteristics of a coating film.

In the electrodes for non-aqueous electrolytic cells, the active materials are poor in electric conductivity, except for some materials, so that conductive materials are used. In general, when the conductive materials are contained in larger amounts, the activity of the active materials is brought out more easily. However, the addition of the conductive materials in large amounts decreases the amounts of the active materials in the volumes of the electrodes, resulting in the decreased capacity of the cells. Efforts have therefore been made to decrease the amounts of the conductive materials while bringing out the activities of the active materials.

Further, the electrodes for non-aqueous electrolytic secondary cells are decreased in capacity to allow deterioration to occur each time they are used. As one of the causes of deterioration of the electrodes for non-aqueous electrolytic secondary cells, it is considered that the contact of the active materials with the conductive materials in the electrodes becomes poor to cause the failure to bring out electricity outside, resulting in deterioration as the cells. Usually, carbon black such as acetylene black or graphite is used as the conductive materials. Acetylene black has a large specific surface area. However, when the active materials are carbon, it has been conceivable that the contact of acetylene black with carbon is not so good.

In addition, the coating films using acetylene black is poor in adhesion thereof to the collectors, so that the problem is liable to occur that the coating films are easily separated, or that the coating films of the electrodes become hard to deteriorate the flexibility of the electrodes, which causes breakage of the electrodes in winding. Acetylene black tends to have a collected form, and therefore, the ratio of the area of the surface of acetylene black in contact with the active material to the whole surface area of acetylene black is not high for its large specific surface area. If the amount of acetylene black is decreased for improving the physical properties of the electrodes, the effect as the conductive materials is lowered.

Compared with the electrodes using acetylene black, the electrodes using graphite have good flexibility. Compared with acetylene black, the graphite is small in specific surface area. Accordingly, for making the contact surface of the graphite with the active materials as large as possible, the graphite having a small particle size or a large amount of graphite has been used. According to the description of the conductive material in Japanese Patent Unexamined Publication No. 63-301460 shown above, it is described that the smaller the particle size is, the more the effect is increased. As described above, however, the use of the graphite having a small particle size results in the reduced cycle life. The reason for this is considered to be that the connection among the conductive material particles is poor because of their small particle size.

Further, in Japanese Patent Unexamined Publication No. 1-105459, the non-aqueous electrolytic secondary cell using $LiMn_2O_4$ and graphite is described, and it is described that the amount of the graphite is preferably from 8% to 22% by weight, as shown above. This means that it is necessary to add the graphite in large amounts to some extent for producing the effect as the conductive material. This will be caused by that if the conductive material is not added in large amounts, the contact surface between the conductive material and the active material does not increase, because the specific surface area of the conductive material is small. The use of the conductive material having a relatively large particle size in large amounts gives an electrode having good cycle life. However, the amount of the active material contained in the volume of the electrode is decreased for that, so that the capacity as the cell is reduced.

The conductive material used in the present invention is the flake graphite. Such graphite is natural graphite or artificial graphite, and one showing flaky form. The flaky form in the present invention means the form of scaly, flaky, stratiform or mica-like thin layers laminated with one another. Such graphite products showing the flaky form include LF series of Chuetsu Graphite Works Co., Ltd., UFG series of Showa Denko, KS series of LONZA, MICROCARBO-G series of Kansai Netsukagaku, Ecos Carbon series of Ecos Giken and naturally occurring flaky graphite or vein graphite. The central particle size thereof is preferably from 1 to 100 μm, and more preferably from 4 to 50 μm.

The positive electrode active materials available in the present invention are lithium-containing metal oxides represented by the general formula of $Li_xM_yO_2$ (wherein M is a metal) or similar metal sulfides. $LiCoO_2$, $LiNi_xCo_{1-x}O_2$ and $LiMn_2O_4$ are preferred. The central particle size thereof is preferably from 1 to 30 μm, and more preferably from 7 to 20 μm.

The negative electrode active materials available in the present invention include amorphous carbon, petroleum coke, coal coke, vapor phase epitaxy carbon fiber, hard carbon, polymer carbon and tin oxides. In the present invention, however, hard carbon and polymer carbon which are high in hardness are preferred. Polymer carbon means a carbon material obtained by heat treating a polymer having a crosslinked structure in an inert atmosphere, and is obtained by carbonization of cellulose, a phenol resin, a furfural resin, polyparaphenylene or polyacrylonitrile. The central particle size of the negative electrode active material is preferably from 1 to 30 μm, and more preferably from 4 to 15 μm.

The present invention is characterized in that even the graphite having a large particle size exhibits the effect by addition thereof in small amounts. Graphite is cleavable, so that the cleavage of even graphite having a large particle size may cause an increase in specific surface area, but results in no substantial reduction in particle size. However, graphite is easily stacked, and if shearing force is carelessly given for loosening stacked one, the graphite is liable to be excessively stacked. For example, it is tried to pulverize graphite in a ball mill, the graphite is pulverized, but easily stacked.

The stacked one is measured as a plane by a measuring gas. However, the plane is not effectively utilized in respect to the contact with the active material. When pressure is applied to the stacked one, the planes adhere to each other to become impossible to be measured even by the measuring gas. In such a respect, the pulverization of graphite is difficult. When it is tried that graphite is pulverized so as not to be stacked, the particle size thereof is reduced.

In the present invention, the graphite is pulverized through two or more steps. First, the graphite is pulverized to a desired particle size using a jet mill or the like. As graphite, pulverized one is usually commercially available, and users select one having a desired particle size. Then, pulverizing this in a ball mill or the like using a medium so as to be cleaved, the graphite can be reduced in thickness with no substantial changes in particle size. By thus subjecting the graphite to the pulverization process twice or more, the specific surface area of the graphite is increased with the particle size thereof kept large. However, it is stacked, so that the bulk density is increased.

In the present invention, the graphite stacked by the pulverization in the ball mill or the like and the active material are mixed and pulverized, thereby being able to reducing the particle size thereof as little as possible while making an effective plane in the graphite, which can come into contact with the active material. The central particle size of the graphite larger than that of the active material achieves the effect of the present invention. It is preferred that the central particle size of the graphite is at least twice larger than that of the active material. The compounding amount of the conductive material is preferably from 0.1% to 15% by weight, and more preferably from 1% to 10% by weight, in the coating film, although it varies depending on the specific surface area of the active material and the like.

In the present invention, the central particle size is measured using a laser particle size analyzer such as a Microtrack particle size analyzer manufactured by Nikkiso Co. Ltd., and means the cumulative percent size in which the frequency cumulation is 50%.

The mixing and pulverization include dry pulverization using an angmill manufactured by Hosokawa Micron Corp. and wet pulverization using a kneader. In the present invention, the mixing and pulverization of the graphite using the active material mean that the active material is allowed to act on the graphite to remove the stacking of the graphite, and/or to further pulverize the graphite. In the mixing and pulverization of the flake graphite and the active material, the stacking of the flake graphite is removed without disrupting the active material so much, and the graphite is more pulverized by the stronger mixing and pulverization, because the flake graphite is low in hardness and has lubricity, and the active material is relatively high in hardness.

By thus subjecting the graphite to the pulverization process twice or more, the subsequent mixing and pulverization become easy, and the conductive material acts effectively. Further, in lithium ion secondary cells, when graphite is used in negative electrodes, it acts as conductive materials and active materials, which is also advantageous in respect to capacity.

When the mixing and pulverization are carried out by a dry process, first, the ratio of the active material to the total amount of the conductive material comprising the flake graphite is established as high as possible, and both are compounded. Then, the resulting mixture is placed into an angmill or a jet mill, and impact force or shearing force is applied from the active material to the graphite to remove the stacking of the graphite and/or to pulverize it. Thereafter, lacking materials are added so as to give a desired final compounding ratio, followed by dispersion with a stirring mixer such as a hyper mixer, a dissolver or a sand grinder mill, if necessary, to finally adjust a paint for an active material layer of an electrode so as to meet the conditions of a coater.

When the mixing and pulverization are carried out by a wet process, first, the ratio of the active material to the total amount of the conductive material comprising the flake graphite is established as high as possible, and both are compounded. This is placed into a kneader, and impact force or shearing force is applied from the active material to the graphite to remove the stacking of the graphite and/or to pulverize it. When the kneader is used for the mixing and pulverization, it is necessary to compound materials in amounts corresponding to the kneading volume of the kneader used, and to sufficiently knead them. If the kneading operation is not conducted so as to form no space in the kneader, the pulverization of the graphite becomes insufficient, resulting in the difficulty of attaining the object of the present invention. As another method, a paint is prepared from the conductive material, the active material, the binder and a solvent, and shearing force is applied thereto with a narrow gap dispersing apparatus such as Ultra Disper so as to increase the shear rate, thereby removing the stacking of the graphite and/or pulverizing the graphite, using the active material.

The mixing ratio of the conductive material to the active material is from 0.1 to 40 parts by weight, and preferably from 2 to 15 parts by weight.

The above-mentioned kneader means an apparatus in which shear is given between a rotary blade called a kneader and a kneading tank. The form thereof may be either a batch treatment type or a continuous treatment type. Examples of the batch treatment type include open type kneaders and pressurization type kneaders. The open type is opened at an upper portion thereof, so that a space is formed. Accordingly, this type is unsuitable for attaining the object of the present invention. The pressurization type can establish a space to a minimum, so that it is possible to obtain the effect of the present invention most efficiently. Further, when the continuous treatment type kneader is used, a space is slightly developed, compared with the pressurization type, because it has a feed structure. However, this type is preferred because the process can be made continuous including pretreatment such as preliminary mixing, kneading, and after-treatment such as dilution and dissolution. Specific examples of the rotary blades of such kneaders include $\Sigma$, Z, cam, roller, S. fish tail and Banbury types. Specific examples of these kneaders include batch treatment type kneaders such as MS type pressurization type kneaders of Moriyama Co., Ltd.; continuous kneaders such as KRC kneaders of Kurimoto, Ltd. and extruders of Fuji Powdernel, Kobe Seitetsusho and Toshiba Machine Co., Ltd.; and further, small-sized kneaders such as desk-top kneaders manufactured by Irie Shokai Co., Ltd., kneaders manufactured by Takabayashi Rika Co., Ltd., and Laboplast mills and Brabender kneaders of Toyo Seiki Co., Ltd. Further, other devices having functions similar to those of these kneaders include two-roll mills and Banbury mixers.

As the binders available in the present invention, thermoplastic resins or polymers having rubber elasticity can be used either alone or as a mixture thereof. Examples of the binders include fluorine polymers, polyvinyl alcohol, carboxymethyl cellulose, hydroxypropyl cellulose, regenerated cellulose, diacetyl cellulose, polyvinyl chloride, polyvinylpyrrolidone, polyethylene, polypropylene, EPDM, sulfonated EPDM, SBR, polybutadiene and polyethylene oxide. Of these, fluorine-containing polymers having a fluorine atom/carbon atom atomic ratio of 0.75 to 1.5, more preferably 0.75 to 1.3, are preferred. When this value is more than 1.5, the capacity of cells can not be sufficiently obtained. In the case of less than 0.75, the binders dissolve in electrolytic solutions. Such fluorine-containing polymers include polytetrafluoroethylene, polyvinylidene fluoride, vinylidene fluoride-ethylene trifluoride copolymers, ethylene-tetrafluoroethylene copolymers and propylene-tetrafluoroethylene copolymers. Further, fluorine-containing polymers in which hydrogen of main chains is substituted by alkyl groups can also be used. Of these, polymers indicating selective solubility (low in solubility in electrolytic solutions and having soluble solvents) are preferred. For example, in the case of vinylidene fluoride polymers, they are difficult to dissolve in carbonate solvents used as electrolytic solutions, but soluble in solvents such as N,N-dimethylformamide and N-methylpyrrolidone. The compounding amount of such a binder in the coating film is preferably from 2% to 20% by weight, and more preferably from 3% to 15% by weight, although it varies depending on the specific surface area and grain size of the active material and conductive material, and the desired strength of the electrode.

As the solvents for such paints for active material layers of the electrodes, ordinary organic solvents can be used, and specific examples thereof include organic solvents such as saturated hydrocarbons such as hexane, aromatic hydrocarbons such as toluene and xylene, alcohols such as methanol, ethanol, propanol and butanol, ketones such as acetone, methyl ethyl ketone, methyl isobutyl ketone and diisobutyl ketone, esters such as ethyl acetate and butyl acetate, ethers such as tetrahydrofuran, dioxane and diethyl ether, amides such as N,N-dimethylformamide, N-methylpyrrolidone and N,N-dimethylacetamide, and hydrocarbon halides such as ethylene chloride and chlorobenzene. Of these, amide solvents are preferred because they can dissolve the fluorine-containing polymers. These solvents can be used either alone or as a mixture of two or more of them.

Further, the collectors for such electrode active material compositions may be any, as long as they are electronic conductors which do not bring about chemical changes in cells constructed. For example, however, aluminum, copper, stainless steel, nickel, titanium and burned carbon can be used. Further, surfaces of these may be treated with carbon, nickel, titanium or silver. In particular, aluminum foil and copper foil are desirable, considering the resistance to oxidation, the flexibility of electrodes and the cost. These collectors are coated with the electrode active material composition paints by coating methods generally well known such as reverse roll methods, direct roll methods, blade methods, knife methods, extrusion methods, curtain methods, gravure roll methods, bar coat methods, dip methods, kiss coat methods and squeeze methods. Extrusion methods are preferred among others, and the good surface state of a coated layer can be obtained by selecting the solvent composition for the paint and the drying conditions so as to be coated at a speed of 5 to 100 m/minute. The thickness, length and width of the coated layer is determined by the size of a final cell. The thickness of the coated layer is preferably adjusted by press working generally employed after coating. The working pressure is preferably 0.2 to 10 t/cm, and the working temperature is preferably 10 to 150° C.

Figure 1:
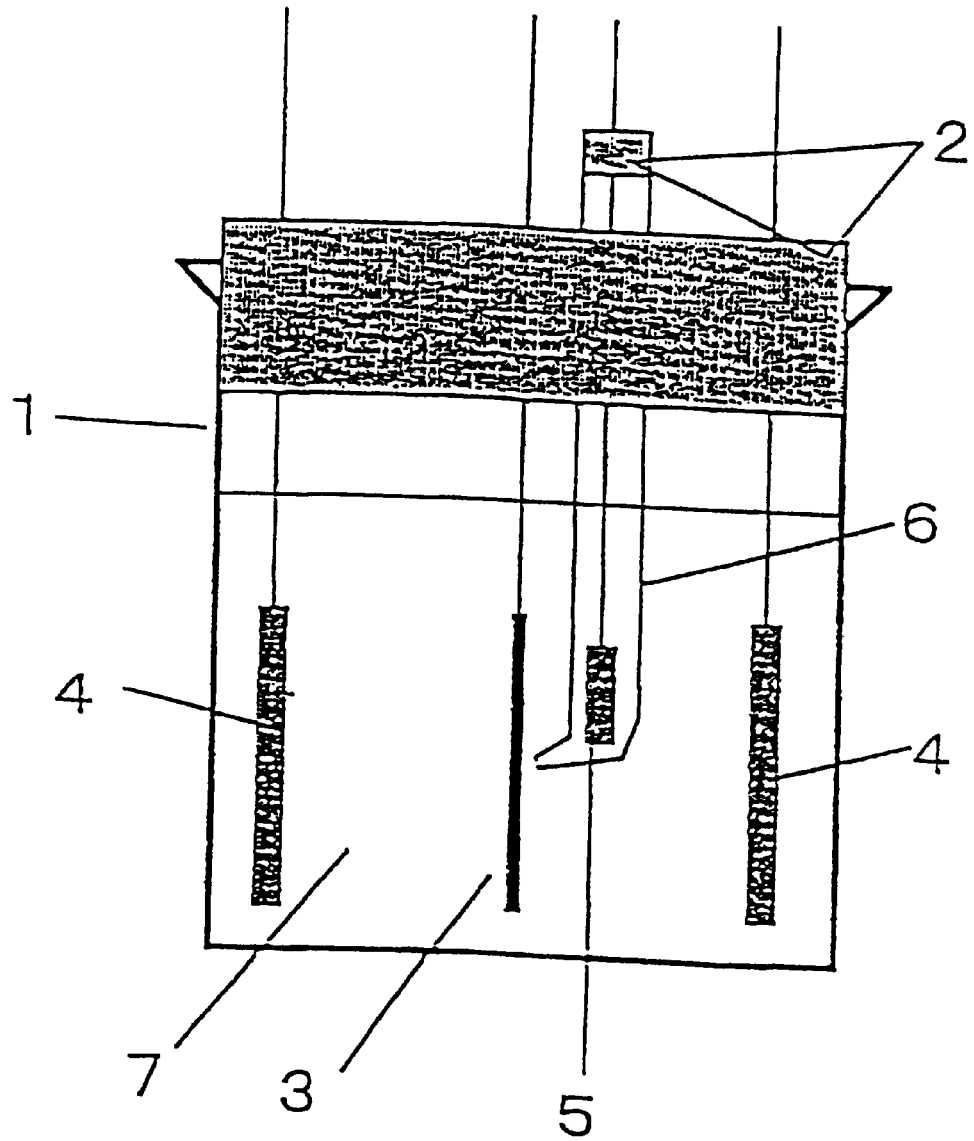
FIG. 1 is a cross sectional view showing a cell for measuring charge and discharge characteristics. Reference characters in the figure show the following.

1 Beaker
2 Silicone stopper
3 Electrode (working electrode)
4 Counter electrodes
5 Reference electrode
6 Capillary
7 Electrolytic solution

BEST MODE FOR CARRYING OUT THE INVENTION (Negative Electrode)

EXAMPLE 1

Active material layers were prepared in the following manner.
(Composition of Active Material Layer Paint)

| | |
|---|---|
| Active material<br>Hard carbon (central particle size 4.2 μm): | 80 |
| Conductive material<br>Graphite KS75 manufactured by LONZA: | 10 |
| Binder<br>KYNAR741 manufactured by ELF-ATOCHEM<br>Japan: Polyvinylidene fluoride (PVDF) | 10 |
| Solvent<br>N-Methyl-2-pyrrolidone (NMP): | 150 |

The unit is parts by weight.

In 150 parts by weight of NMP, 10 parts by weight of PVDF was dissolved to prepare 160 parts by weight of a binder solution. The conductive material was pulverized with a jet mill to prepare one having a central particle size of 18 μm, and then, pulverized for 7 hours with a ball mill using zirconia beads as a medium to obtain one having a BET specific surface area of 19 m$^2$/g. Then, 80 parts by weight of the active material and 10 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 1.

EXAMPLE 2

An active material layer paint was prepared in the same manner as with Example 1 with the exception that a conductive material was used in which the conductive material of Example 1 was pulverized with a jet mill to prepare one having a central particle size of 12 μm, which was then pulverized with a ball mill for 5 hours to a BET specific surface area of 20 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 2.

EXAMPLE 3

An active material layer paint was prepared in the same manner as with Example 1 with the exception that a conductive material was used in which the conductive material of Example 1 was pulverized with a jet mill to prepare one having a central particle size of 8 μm, which was then pulverized with a ball mill for 4 hours to a BET specific surface area of 21 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 3.

EXAMPLE 4

An active material layer paint was prepared in the same manner as with Example 1 with the exception that a conductive material was used in which the conductive material of Example 1 was changed to natural flake graphite (LF-18A manufactured by Chuetsu Graphite Works Co., Ltd., having a central particle size of 18 μm), which was pulverized with a ball mill for 9 hours to a BET specific surface area of 20 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 4.

EXAMPLE 5

An active material layer paint was prepared in the same manner as with Example 1 with the exception that a conductive material was used in which the conductive material of Example 1 was pulverized with a jet mill to prepare one having a central particle size of 3.5 μm, which was then pulverized with a ball mill for 30 minutes to a BET specific surface area of 20 m²/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 5.

Comparative Example 1

The conductive material of Example 1 was changed to acetylene black (Denka Black manufactured by Denki Kagaku Kogyo), and 80 parts by weight of the active material and 10 parts by weight of acetylene black were placed into an angmill, followed by mixing and pulverization for 20 minutes. The binder solution was added thereto, followed by mixing by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 1.

Comparative Example 2

The conductive material of Example 1 was changed to vapor growth carbon fiber (VGCF manufactured by Showa Denko), and 80 parts by weight of the active material and 10 parts by weight of the vapor growth carbon fiber were placed into an angmill, followed by mixing and pulverization for 20 minutes. The binder solution was added thereto, followed by mixing by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 2.

Comparative Example 3

The conductive material of Example 1 was pulverized with a jet mill to prepare one having a central particle size of 18 μm, and then, pulverized for 7 hours with a ball mill using zirconia beads as a medium to obtain one having a BET specific surface area of 19 m²/g. Then, 80 parts by weight of the active material and 10 parts of the conductive material pulverized were placed into a hyper mill, and dry mixed. To this mixture, 160 parts by weight of the binder solution was added, and mixed by stirring for 60 minutes to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 3.

Comparative Example 4

The conductive material of Example 1 was pulverized with a jet mill to prepare one having a central particle size of 18 μm. Then, 80 parts by weight of the active material and 10 parts of the conductive material pulverized were dry mixed by a hyper mixer. To this mixture, 160 parts by weight of the binder solution was added, and mixed by stirring for 60 minutes to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 4.

Comparative Example 5

The conductive material of Example 1 was pulverized with a jet mill to prepare one having a central particle size of 18 μm. Then, 80 parts by weight of the active material and 10 parts of the conductive material pulverized were placed into an angmill, and mixed and pulverized for 20 minutes. To this mixture, the binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 5.

Evaluation Method (Electrode Characteristics)

Each of the samples of Examples 1 to 5 and Comparative Examples 1 to 5 was cut to a size 25 mm in length and 20 mm in width, and the electrode layer was removed in a length of 5 mm at an upper end portion to leave the electrode layer 20 mm square. A stainless steel wire was spot welded as a lead to the upper end portion from which the electrode layer was removed, thereby preparing an electrode (working electrode).

As shown in FIG. 1, a cell for measuring charge and discharge capacity was prepared to conduct charge and discharge as follows.

A pair of counter electrodes 4 using lithium plates each of which is connected to a stainless steel wire and a caplillary 6 having a similar reference electrode 5 were arranged in a beaker 1, and the electrode (working electrode) 3 prepared above was further arranged between the counter electrodes. As an electrolytic solution 7, a solution obtained by dissolving 1 mol/liter of lithium perchlorate as an electrolytic salt in a mixed solvent of ethylene carbonate and diethyl carbonate of a volume ratio of 1:1 was used. Each of the beaker and the capillary was sealed with a silicone stopper. Thus, the cell for measurement was prepared.

Then, charge and discharge were repeated 5 times to this cell at a constant current of 2 mA within the range of 0 V to 2 V (potential vs Li/Li$^+$). The first capacity in releasing Li ions was measured, and taken as the initial capacity. Further, the fifth capacity was also measured, and taken as the charge and discharge cycle characteristic.

(Positive Electrode)

EXAMPLE 6

Active material layers were prepared in the following manner.

(Composition of Active Material Layer Paint)

| | |
|---|---|
| Active material<br>$LiNi_{0.8}Co_{0.2}O_2$:<br>Central particle size 10 µm | 93 |
| Conductive material<br>Graphite KS75 manufactured by LONZA: | 4 |
| Binder<br>KYNAR741 manufactured by ELF-ATOCHEM<br>Japan: Polyvinylidene fluoride (PVDF) | 3 |
| Solvent<br>N-Methyl-2-pyrrolidone (NMP): | 67 |

The unit is parts by weight.

In 67 parts by weight of NMP, 3 parts by weight of PVDF was dissolved to prepare 70 parts by weight of a binder solution. The conductive material was pulverized with a jet mill to prepare one having a central particle size of 18 µm, and then, pulverized for 7 hours with a ball mill using zirconia beads as a medium to obtain one having a BET specific surface area of 19 m²/g. Then, 93 parts by weight of the active material and 4 parts of the conductive material pulverized were placed into an angmill, and mixed and pulverized for 20 minutes. To this mixture, 70 parts by weight of the above-mentioned binder solution was added, and mixed by stirring by a hyper mixer for 60 minutes to obtain an active material layer paint.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Example 6.

EXAMPLE 7

An active material layer paint was prepared in the same manner as with Example 6 with the exception that a conductive material was used in which the conductive material of Example 6 was pulverized with a jet mill to prepare one having a central particle size of 3.5 µm, which was then pulverized with a ball mill for 30 minutes to a BET specific surface area of 20 m²/g.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Example 7.

Comparative Example 6

The conductive material of Example 1 was changed to acetylene black (Denka Black manufactured by Denki Kagaku Kogyo), and 93 parts by weight of the active material and 4 parts by weight of acetylene black were placed into an angmill, followed by mixing and pulverization for 20 minutes. The binder solution was added thereto, followed by mixing by a hyper mixer to obtain an active material layer paint.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Comparative Example 6.

Comparative Example 7

The conductive material of Example 6 was pulverized with a jet mill to prepare one having a central particle size of 18 µm, and then, pulverized for 7 hours with a ball mill using zirconia beads as a medium to obtain one having a BET specific surface area of 19 m²/g. Then, 93 parts by weight of the active material and 4 parts of the conductive material pulverized were dry mixed by a hyper mixer. To this mixture, 70 parts by weight of the binder solution was added, and mixed by stirring for 60 minutes to obtain an active material layer paint.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Comparative Example 7.

Comparative Example 8

The conductive material of Example 6 was pulverized with a jet mill to prepare one having a central particle size of 18 µm. Then, 93 parts by weight of the active material and 4 parts of the conductive material pulverized were dry mixed by a hyper mixer. To this mixture, 70 parts by weight of the binder solution was added, and mixed by stirring for 60 minutes to obtain an active material layer paint.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Comparative Example 8.

Comparative Example 9

The conductive material of Example 6 was pulverized with a jet mill to prepare one having a central particle size of 18 µm. Then, 93 parts by weight of the active material and 4 parts of the conductive material pulverized were placed into an angmill, and mixed and pulverized for 20 minutes. To this mixture, the binder solution was added, and mixed by a hyper mixer to obtain an active material layer paint.

The paint thus prepared was applied onto one side of a collector of aluminum foil with a blade coater, and dried. Then, the same paint was applied onto the reverse side thereof, and dried, followed by compression molding with a roller press and cutting to a specified size to obtain an electrode of Comparative Example 9.

Evaluation Methods (Adhesive Property)

The test was carried out based on the cross-cut adhesion test of JIS K 5400 8.5.1 to examine the adhesive property of the coating film to aluminum foil. One side of the coating films coated on both sides of aluminum foil was cut in a check pattern with a scratching tester (Erichsen Model 295, 11 blades at 1 mm intervals), and graded based on JIS.

(Electrode Characteristics)

In each of the samples of Examples 6 and 7 and Comparative Examples 6 to 9, a cell for measurement was prepared in the same manner as with the negative electrode.

Then, charge and discharge were repeated 5 times to this cell at a constant current of 6 mA within the range of 3 V to 4.2 V (potential vs $Li/Li^+$). The first capacity in occluding Li ions was measured, and taken as the initial capacity. Further, the fifth capacity was also measured, and taken as the charge and discharge cycle characteristic.

TABLE 1

|  | Ball Mill Pulverization | Mixing and Pulverization | Conductive Material | Initial Capacity (mAh/g) | 5Th Capacity (mAh/g) |
| --- | --- | --- | --- | --- | --- |
| Example 1 | Conducted | Conducted | Graphite | 394 | 365 |
| Example 2 | Conducted | Conducted | Graphite | 387 | 342 |
| Example 3 | Conducted | Conducted | Graphite | 401 | 375 |
| Example 4 | Conducted | Conducted | Graphite | 396 | 366 |
| Example 5 | Conducted | Conducted | Graphite | 368 | 270 |
| Comparative Example 1 | Conducted | Conducted | Acetylene black | 352 | 198 |
| Comparative Example 2 | Conducted | Conducted | VGCF | 364 | 220 |
| Comparative Example 3 | Conducted | Not conducted | Graphite | 381 | 198 |
| Comparative Example 4 | Not conducted | Not conducted | Graphite | 372 | 202 |
| Comparative Example 5 | Not conducted | Conducted | Graphite | 377 | 258 |

TABLE 2

|  | Ball Mill Pulverization | Mixing and Pulverization | Conductive Material | Initial Capacity (mAh/g) | 5th Capacity (mAh/g) | Adhesive Property Cross-Cut Adhesion Test |
| --- | --- | --- | --- | --- | --- | --- |
| Example 6 | Conducted | Conducted | Graphite | 195 | 190 | Grade 8 |
| Example 7 | Conducted | Conducted | Graphite | 199 | 152 | Grade 8 |
| Comparative Example 6 | Conducted | Conducted | Acetylene black | 184 | 179 | Grade 2 |
| Comparative Example 7 | Conducted | Not conducted | Graphite | 188 | 118 | Grade 8 |
| Comparative Example 8 | Not conducted | Not conducted | Graphite | 165 | 96 | Grade 8 |
| Comparative Example 9 | Not conducted | Conducted | Graphite | 183 | 141 | Grade 8 |

As is known from Table 1, even a small amount of graphite brings out the characteristics of the active materials by subjecting the graphite to the pulverization process twice or more, followed by mixing and pulverization thereof. The capacity of the electrodes prepared is also increased, and the cycle characteristic suggesting the life of secondary cells is also improved.

Table 2 also indicates that even if the amount of graphite is small, the cycle characteristic is improved by subjecting the graphite to the pulverization process twice or more, followed by mixing and pulverization thereof. Further, the electrodes using the graphite are good in the adhesive property, and also obtain high grades in the cross-cut adhesion test.

INDUSTRIAL APPLICABILITY

The electrodes for non-aqueous electrolytic cells produced by the methods of the present invention are good in the charge and discharge characteristics such as the discharge capacity and the charge and discharge cycle life, and improved in physical characteristics. They are therefore very effectively utilized in the field in which the electrodes for non-aqueous electrolytic cells are employed.

What is claimed is:

1. A method for producing an electrode for a non-aqueous electrolytic cell, comprising subjecting flake graphite to a pulverization process at least two times, forming a mixture of said flake graphite and an active material by mixing and pulverizing said flake graphite in combination with said active material, and coating a collector with an electrode active material layer comprising said mixture of flake graphite and said active material, and a binder.

2. The method according to claim 1, wherein said graphite has a central particle size that is larger than that of said active material.

* * * * *